Oct. 6, 1970  R. D. STROUD  3,532,372
PLASTIC INTERLOCK
Filed Sept. 14, 1967
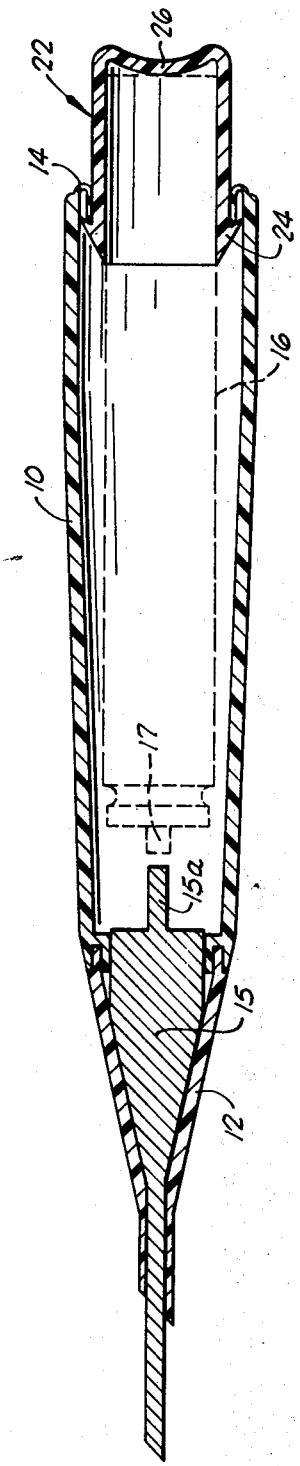
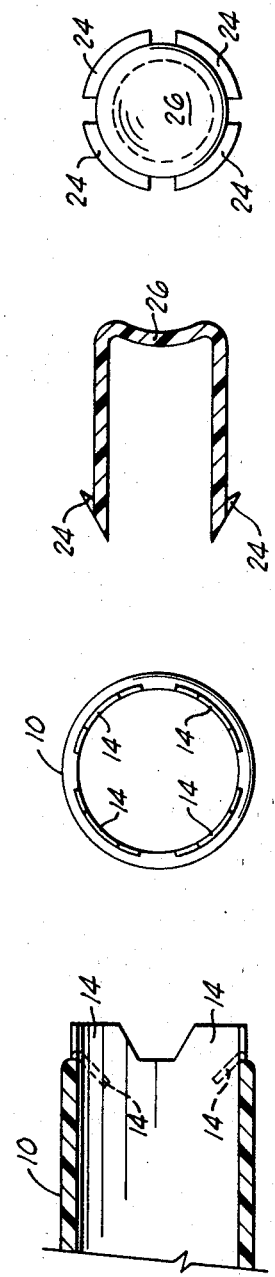
INVENTOR.
RAY D. STROUD
BY
Dunlap and Laney
ATTORNEYS

United States Patent Office 3,532,372
Patented Oct. 6, 1970

3,532,372
PLASTIC INTERLOCK
Ray D. Stroud, 2421 NW. 59th St.,
Oklahoma City, Okla. 73112
Filed Sept. 14, 1967, Ser. No. 667,732
Int. Cl. F16b 7/22
U.S. Cl. 287—103
6 Claims

ABSTRACT OF THE DISCLOSURE

An interlock consisting of two parts of generally tubular configuration which have telescoping end portions carrying cooperating elements engaging the two parts against realtive movement in one direction. One of these elements which is carried on the part whose end portion is telescoped inside the other part is a tapered undercut barb, and the other element carried on the second part which cooperates with the undercut barb is a sleeve or plurality of flaps positioned within the end portion of the second element and connected at one end with the end of the second element. When the two parts are interconnected to form the interlock, the sleeve extends into the undercut between the barb and the outer peripheral surface of the innermost of the telescoped parts. In one specific embodiment of the invention, the interlock is formed between a closure cap and one end of a tubular barrel which is tapered to a probe retaining nozzle at its opposite end.

BACKGROUND OF THE INVENTION

Field of the invention

This invention relates to interlocking structures, and more specifically, to synthetic resin interlocking assemblies used to engage a pair of telescoped tubular synthetic resin elements to limit the longitudinal movement of the members with respect to each other in one direction.

Brief description of the problem giving rise to the invention

In some systems heretofore in use for dispensing materials, such as the dispensation of a Freon refrigerant in some types of surgical operations, a storage container or canister containing the fluid to be dispensed is placed in a tubular barrel, and material is then dispensed from this container onto the internal portion of a probe which projects from one end of the barrel. To position the container of the material in the barrel, it is inserted through an open end of the barrel opposite the end which carries the probe, and if such container is ever removed from the barrel, it is necessary to remove it from the same open end of the barrel through which it was inserted. In some instances, such as the surgical use cited, it is not desirable to reuse the barrel, and yet this will often be attempted by removing and replacing the depleted storage container or canister, unless some means is provided for preventing such removal and replacement. Friction type plugs or screw caps are obviously not well-suited to close the open end of the barrel for preventing reuse of this type.

In other instances, a need frequently exists for a means or telescoping two tubular members by forcing one inside the other and then having the members become engaged or interlocked against disengaging longitudinal movement in one direction relative to each other.

Brief description of the present invention

The present invention relates to a synthetic resin interlock by means of which two tubular members can be telescopingly engaged in a manner such that they are limited in the extent to which they can move in one longitudinal direction relative to each other. In one form of the invention, one of these tubular members forms a plunger cap for the open end of a tubular barrel of a dispensing device of the type hereinbefore described.

Broadly described, the synthetic resin assembly of the present invention comprises a first tubular member having at least one undercut barb positioned externally of the tubular member and at one end thereof; a second tubular member telescopingly surrounding, and spaced from the first tubular member; at least one flap having one of its ends connected to, and preferably formed integrally with, the end of the second tubular member which surrounds the first tubular member. The flap is turned inside the second tubular member into the space between the first and second tubular members and has a free end which is aligned with the undercut of the barb. The flap is resiliently deformed inwardly into the second tubular member so that it bears against the outer wall of the first or inner tubular member.

In a preferred embodiment of the invention, a plurality of the described flaps are provided in circular or annular array on the end of the second tubular member, and the undercut barb is shaped as an annular rib having circumferentially spaced notches therein. The synthetic resin of which the interlock is constructed is preferably polypropylene, though other synthetic resin materials having a flexural modulus of 6,000 to 600,000 may also be used.

With the two tubular members joined in the manner described, a tenacious interlock is formed which prevents the members from being pulled apart in one direction, thus achieving a major object of the invention.

Another object of the invention is to provide an automatically locking closure cap which, when fitted in an open end of a tubular barrel which is restricted or closed at the other end, cannot be removed from the barrel.

A further object of the invention is to provide an economically constructed, tenaciously engaging synthetic resin interlock.

An additional object of the invention is to provide a dispensing device in which a fluid is dispensed to the interior of a tubular barrel from a contaner inserted in the barrel, which device cannot be reused after the contents of the container are depleted.

Other objects and advantages of the invention will become apparent as the following detailed description of the invention is read in conjunction with the accompanying drawings which illustrate the invention.

BRIEF DESCRIPTION OF THE DRAWINGS

FIG. 1 is a sectional view taken along the longitudinal center line of a dispensing device incorporating the synthetic resin interlock of the present invention.

FIG. 2 is an enlarged sectional view of the end portion of a tubular member constituting one of the basic or major portions of the interlock of the present invention.

FIG. 3 is an end elevation view of the tubular member depicted in section in FIG. 2, and illustrating the formation of a plurality of interlock flaps thereon.

FIG. 4 is an enlarged sectional view through a second tubular member constituting a second major portion or element of the interlock of the present invention.

FIG. 5 is an end view of the tubular member depicted in FIG. 4.

DETAILED DESCRIPTION OF A PREFERRED EMBODIMENT OF THE INVENTION

Referring initially to FIG. 1 of the drawings, shown therein is a refrigerated probe device of the type used in some kinds of surgical operations. The refrigerated probe device includes an elongated tubular barrel 10 which receives at one of its ends a probe nozzle 12, and which carries at its opposite end a plurality of relatively thin, flexible locking flaps 14 which are depicted as folded inwardly along the internal wall of the barrel 10. A metallic probe element 15 is placed in the probe nozzle and carries a valve actuating protuberance 15a which extends into the barrel 10 along the axis thereof. A Freon tube or canister 16 as depicted in dashed lines is disposed inside the barrel 10, and is capable of dispensing Freon or other suitable refrigerant against the base of the probe element 15 when a valve stem 17 carried by the canister 16 is dispressed by movement of the canister toward the valve actuating protuberance 15a. It will be noted that the end of the barrel 10 which is attached to the probe nozzle 12 is of such restricted diameter that the tube 16 cannot pass therethrough, but must instead be placed in the barrel through the open end thereof which carries the locking flaps 14.

The structure of the locking flaps 14 can be better perceived by reference to FIGS. 2 and 3 of the drawings. It will be noted in referring to these figures that four of the locking flaps 14 are provided, and are arranged in a substantially annular array around the end of the tubular barrel 10. Preferably, the locking flaps 14 are formed integrally with the tubular barrel 10 and posesess sufficient resiliency to permit them to be bent through approximately 180° and turned inwardly within the barrel as depicted in FIG. 1.

Before the Freon tube 16 is inserted in the barrel 10, its base or lower end is surrounded by a tubular locking cap 22 which is diametrically sized to relatively closely surround the Freon tube 16, and which has an outside diameter sufficiently small to permit it to be telescoped inside the open end of the tubular barrel 10. The tubular locking cap 22 carries at its end which is telescoped into the tubular barrel 10, a plurality of undercut barbs 24, these being best depicted in FIGS. 4 and 5. The construction of the barbs 24 in the illustrated embodiment of the invention may be considered in two ways. The barb means may be considered as either an annular member having circumferentially spaced serrations or notches formed therein so as to effectively constitute a plurality of barbs, or the structure may be thought of as a plurality of undercut barbs arranged in an annular array and spaced circumferentially from each other. It may be noted in passing that a substantially equivalent structure which could be utilized is a single annular undercut barb which completely surrounds the internal or free end of the tubular locking cap 22 without interruption over its annular course. At the opposite end of the tubular locking cap 22 from the barbs 24, the locking cap is closed by a concave wall 26 which, like the barbs 24, is preferably integrally formed with the tubular portion of the locking cap. It may be noted in passing that both the locking cap 22 and the tubular barrel 10 are preferably cylindrical in configuration.

In assembling the dispensing device depicted in FIG. 1, the tubular locking cap 22 is first placed over the base end of the Freon tube 16. After the locking flaps have been bent inwardly through an angle of at least 90° (from the full line to the dashed line position shown in FIG. 2), the tube and locking cap are then telescopingly inserted in the tubular barrel 10. As the end of the tubular locking cap 22 which carries the barbs 24 moves into the tubular barrel 10, the flexibility of the locking flaps 14 permits these flaps to be pressed radially outwardly against the internal walls of the tubular barrel 10 to pass the barbs 24. The barbs 24 also possess sufficient resiliency to yield inwardly slightly. Once the barbs 24 have reached the free ends of the locking flaps 14 inside the barrel 10, these locking flaps, due to their inherent resilient characteristic, snap radially inwardly into the undercut of the barbs 24.

An interlock of the type depicted in FIG. 1 is thus established and, in consequence of this interlock, the tubular locking cap 22 cannot be removed or displaced from the tubular barrel 10 by attempting to withdraw it from the open end of this barrel which carries the locking flaps.

The dispensing device constituted by the assembly depicted in FIG. 1 can then be subsequently utilized for the purpose of dispensing Freon or other refrigerant from the tube or canister 16 to the interior of the barrel 10 by any suitable means. One means contemplates the further projection of the locking cap 22 into the barrel 10 to force the tube 16 forwardly therein until the valve stem 17 of the tube strikes the valve actuating protuberance 15a. Upon the establishment of this contact, the Freon may be automatically released and discharged against the probe element 15 to refrigerate the probe. The cold gas is vented through the space between the locking cap 22 and the barrel 10.

The interlock which is formed between the tubular barrel 10 and the tubular locking cap 22 can be used in many other applications and environments of use other than that which is depicted in FIG. 1 of the drawings. In virtually any situation where it is desired to have a firm interlock between two tubular members which functions to prevent disengagement of one of the tubular members from the other, the present invention affords a relatively economical, and yet reliable and dependable solution.

The synthetic resins of which the two tubular members are constructed is of considerable importance to the attainment of a durable and well-functioning interlock in accordance with the present invention. It is particularly important for the locking flaps 14 to have certain properties, the most important of these being a flexural modulus ranging from about 6,000 to about 600,000. A material which has been found to be especially useful in the construction, not only of the locking flaps 14, but of the tubular barrel 10 and the tubular locking cap 22 is polypropylene. Other polyolefinic synthetic resins may also be employed quite successfully.

From the foregoing description of the invention, it will have become apparent that the invention provides a simple, economically constructed and long-lasting interlock which is reliable in operation to limit relative longitudinal movement of the tubular members with respect to each other after the interlock has been formed. Although a preferred embodiment has been herein described in order to provide an example of the invention and the manner in which it is to be practiced, it will be understood that various changes in the preferred geometry of the interlock, and in the specific suggested materials of construction thereof can be effected without departure from the basic principles which underlie the invention. All changes of this type which continue to rely on such basic principles are therefore deemed to be circumscribed by the spirit and scope of the invention except as the same may be necessarily limited by the appended claims or reasonable equivalents thereof.

What is claimed is:

1. A synthetic resin interlock comprising:
  a first synthetic resin tubular member having at least one integrally formed circumferentially extending undercut barb positioned externally thereof;
  a second synthetic resin tubular member of greater internal transverse dimension than the external transverse dimension of the first tubular member telescopingly surrounding an end of said first tubular member and the portion of said first tubular member which carries said undercut barb, and defining with said first tubular member a space between said tubular members in which said barb is located, said second tubular member having a reversely bent integrally formed flap of less thickness than said second tubular member extending from an end thereof and into the space between said tubular members and into the undercut of said barb, said flap being resiliently deformable to pass said first tubular member and barb when said first tubular member is telescoped in said second tubular member by passing said end of said first tubular member through said end of said second tubular member, said flap bearing against the external periphery of said first tubular member over a major portion of the length of said flap, said first member being of uniform transverse dimension along that portion thereof inside said second member along exteriorly adjacent the end of said second member.

2. A synthetic resin interlock as defined in claim 1 wherein a plurality of said flaps are provided in circumferential array on said end of said second tubular member, and said undercut barb is a circumferential rib having circumferentially spaced notches therein.

3. A synthetic resin material is defined in claim 1 wherein said flap has a flexural modulus of from about 6,000 to about 600,000.

4. A synthetic resin interlock as defined in claim 1 wherein said tubular members are each cylindrical, and wherein said flap is hingedly connected to said end of said second tubular member and bears resiliently against the outer peripheral surface of said first tubular member.

5. A synthetic resin interlock as defined in claim 1 wherein said second tubular member and said flap are constructed of polyolefinic material.

6. A synthetic resin material as defined in claim 5 wherein said polyolefinic material is polypropylene.

References Cited

UNITED STATES PATENTS

| | | | |
|---|---|---|---|
| 2,350,640 | 6/1944 | Rorke | 220—60 X |
| 2,361,984 | 11/1944 | Williamson | 229—19 |
| 2,534,100 | 12/1950 | Baumgartner | 220—8 X |
| 2,657,817 | 11/1953 | Alvear | 220—60 X |
| 2,928,533 | 3/1960 | Loucony | 206—47 X |
| 2,938,643 | 5/1960 | Geiser et al. | 220—60 X |
| 3,101,841 | 8/1963 | Baldwin | 220—60 X |
| 3,187,964 | 6/1965 | Foster | 220—60 X |
| 3,298,415 | 1/1967 | Klygis | 220—60 X |
| 3,376,996 | 4/1968 | Bardell | 220—60 X |

JOSEPH R. LECLAIR, Primary Examiner

J. R. GARRETT, Assistant Examiner

U.S. Cl. X.R.

220—60; 285—260

PO-1050
(5/69)

UNITED STATES PATENT OFFICE
CERTIFICATE OF CORRECTION

Patent No. 3,532,372      Dated October 6, 1970

Inventor(s) Ray D. Stroud

It is certified that error appears in the above-identified patent and that said Letters Patent are hereby corrected as shown below:

Column 5, line 4, delete "along", and insert -- and --.

Signed and sealed this 8th day December 1970.

(SEAL)
Attest:

EDWARD M. FLETCHER, JR.
Attesting Officer

WILLIAM E. SCHUYLER, JR.
Commissioner of Patents